US012451311B2

(12) United States Patent
Kawaguchi et al.

(10) Patent No.: US 12,451,311 B2
(45) Date of Patent: Oct. 21, 2025

(54) ELECTROMAGNETIC RELAY WITH RE-ARCING SUPPRESSION

(71) Applicant: OMRON Corporation, Kyoto (JP)

(72) Inventors: Naoki Kawaguchi, Kyoto (JP); Takeshi Nishida, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 205 days.

(21) Appl. No.: 18/262,919

(22) PCT Filed: Jan. 18, 2022

(86) PCT No.: PCT/JP2022/001569

§ 371 (c)(1),
(2) Date: Jul. 26, 2023

(87) PCT Pub. No.: WO2022/181118

PCT Pub. Date: Sep. 1, 2022

(65) Prior Publication Data

US 2024/0096580 A1 Mar. 21, 2024

(30) Foreign Application Priority Data

Feb. 26, 2021 (JP) ................................ 2021-029809

(51) Int. Cl.
*H01H 50/38* (2006.01)
*H01H 50/02* (2006.01)

(52) U.S. Cl.
CPC ............ *H01H 50/38* (2013.01); *H01H 50/02* (2013.01)

(58) Field of Classification Search
None
See application file for complete search history.

(56) References Cited

U.S. PATENT DOCUMENTS 11,784,017 B2 * 10/2023 Kawaguchi ............ H01H 50/42 335/201
12,230,464 B2 * 2/2025 Yoo ........................ H01H 50/38
(Continued)

FOREIGN PATENT DOCUMENTS

CN 111180230 A 5/2020
CN 210640160 U 5/2020
(Continued)

OTHER PUBLICATIONS

The International Search Report of International Application No. PCT/JP2022/001569 issued on Apr. 12, 2022.
(Continued)

*Primary Examiner* — Bernard Rojas
(74) *Attorney, Agent, or Firm* — SHINJYU GLOBAL IP

(57) ABSTRACT

An electromagnetic relay includes a first fixed terminal, a first fixed contact, a first movable contact, a case, a first inner wall, a first gas passage, and a first magnet. The case includes a first longitudinal inner side surface and a first lateral inner surface. The first lateral inner side surface includes a first central surface and a first arc contact surface. The first arc contact surface is located between the first central surface and the first longitudinal inner side surface in the lateral direction. The first gas passage includes a first inlet facing the first arc contact surface in the longitudinal direction. The first gas passage is disposed between the first inner wall and the first longitudinal inner side surface. The first magnet elongates an arc generated between the first fixed contact and the first movable contact toward the first arc contact surface.

15 Claims, 14 Drawing Sheets

(56) References Cited

U.S. PATENT DOCUMENTS

| | | | | |
|---|---|---|---|---|
| 2021/0304993 | A1* | 9/2021 | Otsuka | H01H 50/546 |
| 2022/0277912 | A1* | 9/2022 | Yoo | H01H 33/53 |
| 2022/0406545 | A1* | 12/2022 | Park | H01H 50/38 |

FOREIGN PATENT DOCUMENTS

| | | | |
|---|---|---|---|
| JP | 2008-226547 | A | 9/2008 |
| JP | 2013-246872 | A | 12/2013 |
| JP | 2016-24864 | A | 2/2016 |
| JP | 2019-96474 | A | 6/2019 |

OTHER PUBLICATIONS

The Written Opinion of the International Searching Authority of International Application No. PCT/JP2022/001569 issued on Apr. 12, 2022.

* cited by examiner

ELECTROMAGNETIC RELAY WITH RE-ARCING SUPPRESSION

CROSS-REFERENCE TO RELATED APPLICATION

This application is the U.S. National Phase of International Application No. PCT/JP2022/001569, filed on Jan. 18, 2022, which claims priority to Japanese Patent Application No. 2021-029809, filed Feb. 26, 2021. The contents of both of these applications are incorporated herein by reference.

FIELD

The claimed invention relates to electromagnetic relays.

BACKGROUND

In an electromagnetic relay, arcing occurs at the contacts when the current is interrupted. Therefore, some electromagnetic relays are equipped with a magnet for extinguishing an arc. The Lorentz force acting on the arc by the magnet elongates the arc, and thereby rapidly extinguishes the arc.

On the other hand, when the temperature of the contacts rise due to the arc, a part of the contacts may melt and generate high temperature gas containing metal vapor. If this high temperature gas stays in the vicinity of the contacts, the insulation between the contacts may deteriorate and the arc may exhibit re-arcing. Therefore, in the contact mechanism of Japanese Laid-open Patent Application Publication No. 2016-24864, a gas passage for guiding high temperature gas is provided in the case. In this contact mechanism, the magnet is disposed away from the fixed terminal in the longitudinal direction of the case. The gas passage is disposed between the sidewall of the case facing the magnet and the fixed terminal. The gas passage extends in the lateral direction perpendicular to the longitudinal direction. The high temperature gas generated at the contacts passes through the gas passage.

SUMMARY

In the contact mechanism described above, the gas passage extends in the lateral direction and the inlet and the outlet of the gas passage are located near the contacts. Therefore, the high temperature gas is likely to return to the contacts while maintaining its high temperature through the gas passage. Therefore, the effect of reducing the re-arcing of arcs is low. An object of the claimed invention is to suppress re-arcing of an arc caused by high temperature gas generated at a contact in an electromagnetic relay.

An electromagnetic relay according to an aspect of the claimed invention includes a first fixed terminal, a first fixed contact, a first movable contact, a second fixed terminal, a second fixed contact, a second movable contact, a case, a first inner wall, a first gas passage, and a first magnet. The first fixed contact is connected to the first fixed terminal. The first movable contact is configured to contact and separate from the first fixed contact. The second fixed terminal is disposed apart from the first fixed terminal in a longitudinal direction. The second fixed contact is connected to the second fixed terminal. The second movable contact is configured to contact and separate from the second fixed contact. The case houses the first fixed terminal, the first fixed contact, the first movable contact, the second fixed terminal, the second fixed contact, and the second movable contact.

The case includes a first longitudinal inner side surface and a first lateral inner side surface. The first longitudinal inner side surface extends in the longitudinal direction. The first longitudinal inner side surface is disposed apart from the first fixed terminal in a lateral direction perpendicular to the longitudinal direction. The first lateral inner side surface extends in the lateral direction. The first lateral inner side surface includes a first central surface and a first arc contact surface. The first central surface faces the first fixed terminal in the longitudinal direction. The first arc contact surface is disposed between the first central surface and the first longitudinal inner side surface in the lateral direction. The first inner wall is disposed between the first fixed terminal and the first longitudinal inner side surface in the lateral direction. The first inner wall extends in the longitudinal direction. The first gas passage includes a first inlet facing the first arc contact surface in the longitudinal direction. The first gas passage extends in the longitudinal direction. The first gas passage is disposed between the first inner wall and the first longitudinal inner side surface. The first magnet is disposed in the longitudinal direction with respect to the first central surface. The first magnet elongates an arc generated between the first fixed contact and the first movable contact toward the first arc contact surface.

In the electromagnetic relay according to the present aspect, the arc generated between the first fixed contact and the first movable contact is elongated toward the first arc contact surface and contacts the first arc contact surface. High temperature gas generated at the first fixed contact and the first movable contact flows together with the arc toward the first arc contact surface. The high temperature gas flows from the first arc contact surface toward the first inlet and flows from the first inlet into the first gas passage. The first gas passage extends in the longitudinal direction. Therefore, the high temperature gas is prevented from returning to the vicinity of the first fixed contact and the first movable contact. Re-arcing of an arc is thereby suppressed. Also, the high temperature gas flows to the first inlet via the first arc contact surface. Therefore, the consumption of the first inlet is reduced as compared with a case where the high temperature gas flows directly to the first inlet.

The first arc contact surface may be located between the first magnet and the first longitudinal inner side surface in the lateral direction. In this case, the first arc contact surface is disposed at a position not facing the magnet. Thereby, the arc can be efficiently elongated toward the first arc contact surface.

The first inner wall may include a wall surface facing the first gas passage. The first magnet may extend in the lateral direction within a range between a first terminal position aligned with an end of the first fixed terminal and a first wall position aligned with the wall surface. In this case, the high temperature gas can be guided efficiently from the first arc contact surface to the first inlet.

In the longitudinal direction, a distance between the first inner wall and the first lateral inner side surface may be greater than or equal to a distance between the first fixed terminal and the first lateral inner side surface. The high temperature gas can be guided efficiently from the first fixed contact to the first inlet through the first arc contact surface.

A distance in the lateral direction between the first fixed terminal and the first inner wall is less than or equal to a distance in the longitudinal direction between the first fixed terminal and the first lateral inner side surface. In this case, the first gas passage is disposed near the first fixed terminal. Therefore, the high temperature gas can be guided efficiently to the first gas passage.

A width of the first gas passage in the lateral direction may be less than or equal to a distance in the lateral direction between the first fixed terminal and the first inner wall. In this case, a flow velocity of the high temperature gas passing through the first gas passage increases. Thereby, the temperature of gas can be lowered efficiently.

The case may include a first lateral sidewall including the first lateral inner side surface. The first magnet may be embedded in the first lateral sidewall. In this case, the thickness of the first lateral sidewall increases. This improves the cooling effect on the arc and the high temperature gas.

The case may include a corner between the first arc contact surface and the first longitudinal inner side surface. The corner may be slanted with respect to the first arc contact surface and the first longitudinal inner side surface. In this case, the high temperature gas can be guided efficiently from the first arc contact surface to the first inlet.

The case may include a corner between the first arc contact surface and the first longitudinal inner side surface. The corner may have a curved shape. The high temperature gas can be guided efficiently from the first arc contact surface to the first inlet.

The first inlet may have a tapered shape that expands toward the first arc contact surface. In this case, the high temperature gas can be guided efficiently from the first inlet into the first gas passage.

The first inner wall may include a tapered surface extending toward the first arc contact surface. In this case, the tapered surface can efficiently guide the arc toward the first arc contact surface.

The case may include a hole communicating with the first gas passage. In this case, the high temperature gas can escape out of the case through the hole.

The first gas passage may extend from a position facing the first fixed terminal to a position facing the second fixed terminal. In this case, the high temperature gas is prevented from returning to the vicinity of the first fixed contact and the first movable contact. This improves the effect of suppressing re-arcing of the arc.

The electromagnetic relay may further include a second inner wall, a second gas passage, and a second magnet. The case may include a second longitudinal inner side surface and a second lateral inner side surface. The second longitudinal inner side surface may be disposed opposite the first longitudinal inner side surface in the lateral direction. The second longitudinal inner side surface may be spaced apart from the first fixed terminal and the second fixed terminal in the lateral direction. The second lateral inner side surface may be disposed opposite the first lateral inner side surface in the longitudinal direction. The second lateral inner side surface may be spaced apart from the second fixed terminal in the longitudinal direction. The second lateral inner side surface may include a second central surface and a second arc contact surface. The second central surface may face the second fixed terminal in the longitudinal direction. The second arc contact surface may be located in the lateral direction between the second central surface and the second longitudinal inner side surface. The second inner wall may be disposed in the lateral direction between the second fixed terminal and the second longitudinal inner side surface. The second inner wall may extend in the longitudinal direction. The second gas passage may include a second inlet facing the second arc contact surface in the longitudinal direction. The second gas passage may extend in the longitudinal direction. The second gas passage may be disposed between the second inner wall and the second longitudinal inner side surface. The second magnet may be disposed in the longitudinal direction with respect to the second central surface. The second magnet may elongate an arc generated between the second fixed contact and the second movable contact toward the second arc contact surface.

In this case, the arc generated between the second fixed contact and the second movable contact is elongated toward the second arc contact surface and contacts the second arc contact surface. High temperature gas generated at the second fixed contact and the second movable contact flows together with the arc toward the second arc contact surface. The high temperature gas flows from the second arc contact surface toward the second inlet and flows from the second inlet into the second gas passage. The second gas passage extends in the longitudinal direction. Therefore, the high temperature gas is prevented from returning to the vicinity of the second fixed contact and the second movable contact. This improves the effect of suppressing re-arcing of an arc. Also, the high temperature gas flows to the second inlet via the second arc contact surface. Therefore, as compared with a case where the high temperature gas flows directly to the second inlet, consumption of the second inlet is reduced.

The second inner wall and the second gas passage may extend from a position facing the second fixed terminal to a position facing the first fixed terminal. In this case, the high temperature gas is prevented from returning to the vicinity of the second fixed contact and the second movable contact. This improves the effect of suppressing re-arcing of an arc.

DETAILED DESCRIPTION

Figure 1:
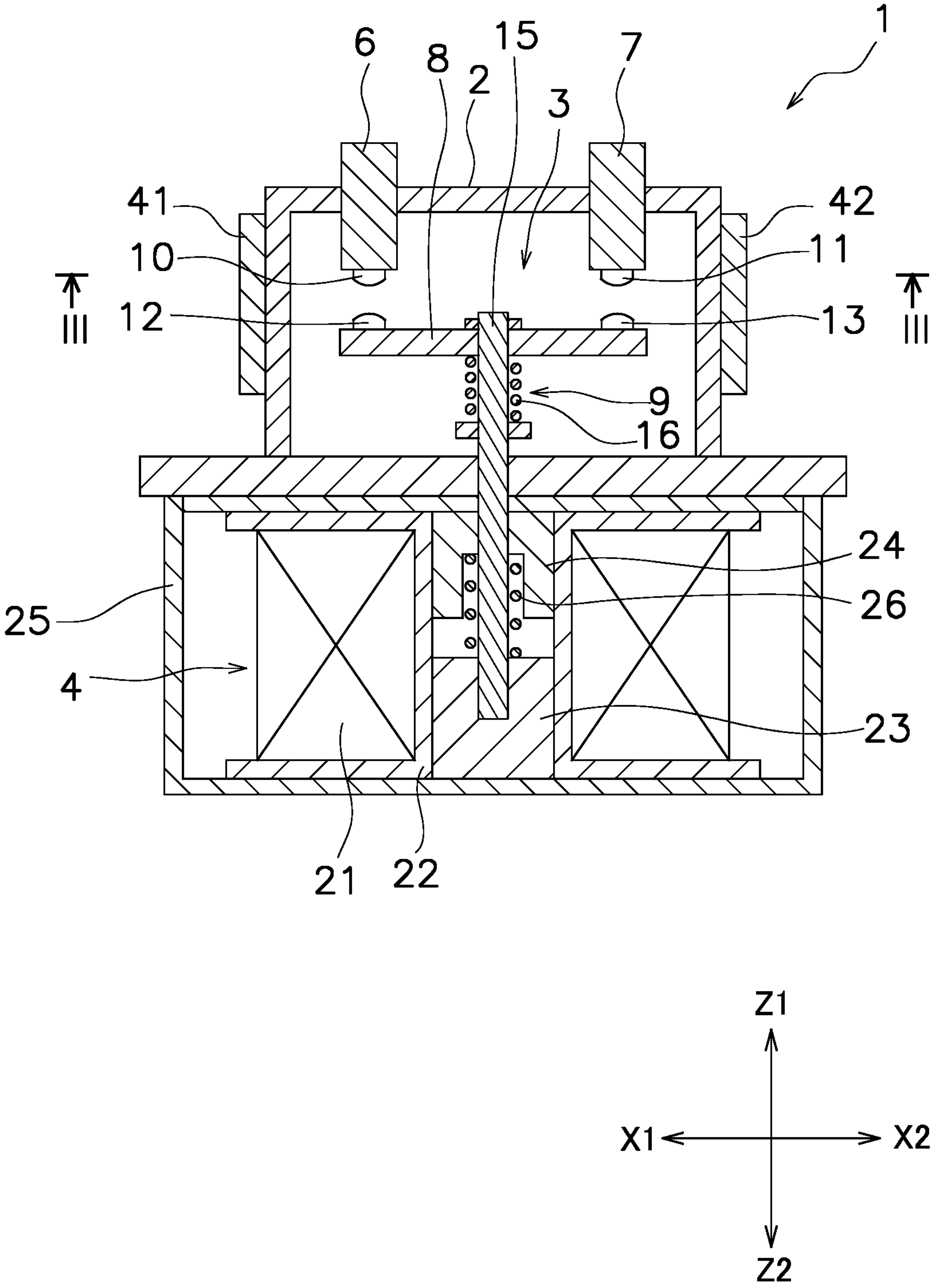
FIG. 1 is a section view of an electromagnetic relay.

Hereinafter, an embodiment of an electromagnetic relay 1 according to one aspect of the claimed invention will be described with reference to the drawings. FIG. 1 is a section view of the electromagnetic relay 1. As shown in FIG. 1, the electromagnetic relay 1 includes a case 2, a contact device 3, and a drive device 4. The case 2 is made of an insulating material such as resin. However, the case 2 may be made of other materials such as ceramics. The contact device 3 is accommodated in the case 2.

The contact device 3 includes a first fixed terminal 6, a second fixed terminal 7, a movable contact piece 8, a movable mechanism 9, a first fixed contact 10, a second fixed contact 11, a first movable contact 12, and a second movable contact 13. In the following description, a direction from the first movable contact 12 to the first fixed contact 10 is defined as "upward (Z1)". A direction from the first fixed contact 10 to the first movable contact 12 is defined as "downward (Z2)". A direction in which the movable contact piece 8 extends is defined as a longitudinal direction (X1, X2). In particular, a direction from the second fixed contact 11 to the first fixed contact 10 is defined as a first longitudinal direction (X1). A direction from the first fixed contact 10 to the second fixed contact 11 is defined as a second longitudinal direction (X2).

The first fixed terminal 6, the second fixed terminal 7, the movable contact piece 8, the first fixed contact 10, the second fixed contact 11, the first movable contact 12, and the second movable contact 13 are made of electrically conductive materials. For example, the first fixed terminal 6, the second fixed terminal 7, and the movable contact piece 8 may be made of metal materials known as terminal materials such as phosphor bronze, beryllium copper, brass, or tough pitch copper. However, the first fixed terminal 6, the second fixed terminal 7, and the movable contact piece 8 may be made of materials different from these materials. The first fixed contact 10, the second fixed contact 11, the first movable contact 12, and the second movable contact 13 are made of metal materials known as contact materials such as copper-based metal or silver-based metal.

The first fixed terminal 6 and the second fixed terminal 7 extend in the vertical direction (Z1, Z2). The first fixed terminal 6 and the second fixed terminal 7 are spaced apart from each other in the longitudinal direction (X1, X2). The first fixed contact 10 is connected to the first fixed terminal 6. The second fixed contact 11 is connected to the second fixed terminal 7. The first fixed contact 10 and the second fixed contact 11 are disposed inside the case 2.

The movable contact piece 8, the first movable contact 12, and the second movable contact 13 are disposed inside the case 2. The first movable contact 12 and the second movable contact 13 are connected to the movable contact piece 8. The first movable contact 12 faces the first fixed contact 10. The first movable contact 12 is configured to contact and separate from the first fixed contact 10. The second movable contact 13 faces the second fixed contact 11. The second movable contact 13 is configured to contact and separate from the second fixed contact 11. The first movable contact 12 is spaced apart from the second movable contact 13 in the longitudinal direction (X1, X2).

Figure 2:
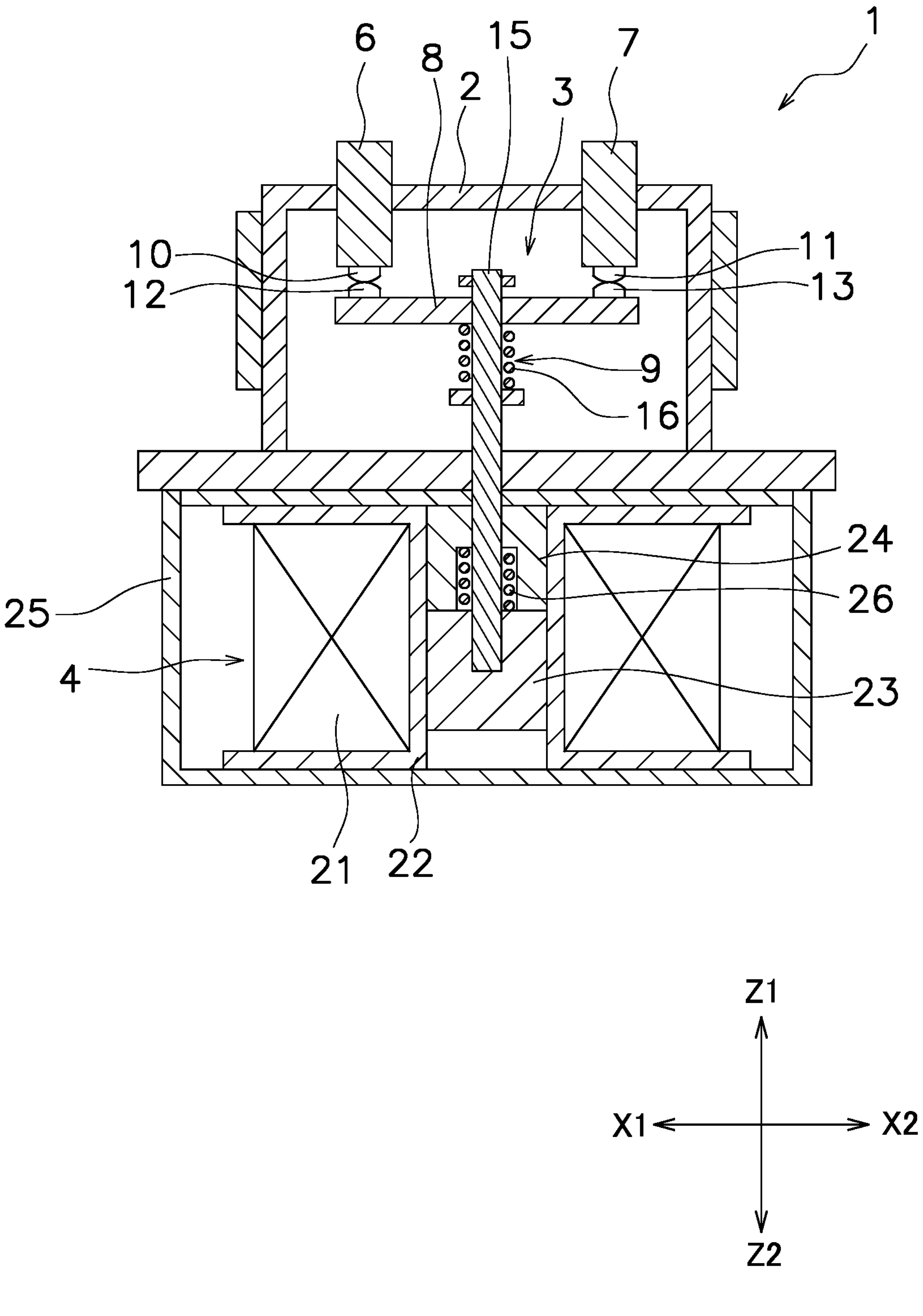
FIG. 2 is a section view of the electromagnetic relay.

The movable contact piece 8 is movable in the vertical direction (Z1, Z2). The movable contact piece 8 is movable between a closed position and an open position. As shown in FIG. 1, when the movable contact piece 8 is at the open position, the movable contacts 12 and 13 are separated from the fixed contacts 10 and 11. As shown in FIG. 2, when the movable contact piece 8 is at the closed position, the movable contacts 12 and 13 are in contact with the fixed contacts 10 and 11. Hereinafter, a direction in which the movable contacts 12 and 13 approach the fixed contacts 10 and 11 is defined as a contact direction. A direction in which the movable contacts 12 and 13 separate from the fixed contacts 10 and 11 is defined as a separation direction.

The movable mechanism 9 supports the movable contact piece 8. The movable mechanism 9 includes a drive shaft 15 and a contact spring 16. The drive shaft 15 is connected to the movable contact piece 8. The drive shaft 15 extends in the vertical direction (Z1, Z2) and extends through the movable contact piece 8 in the vertical direction (Z1, Z2). The drive shaft 15 is configured to move in the vertical direction (Z1, Z2). The contact spring 16 biases the movable contact piece 8 in the contact direction.

The drive device 4 includes a coil 21, a spool 22, a movable iron core 23, a fixed iron core 24, a yoke 25, and a return spring 26. The drive device 4 moves the movable contact piece 8 between the open position and the closed position via the movable mechanism 9 by an electromagnetic force. The coil 21 is wound around the spool 22. The movable iron core 23 and the fixed iron core 24 are disposed inside the spool 22. The movable iron core 23 is connected to the drive shaft 15. The movable iron core 23 is movable in the vertical direction (Z1, Z2). The fixed iron core 24 is disposed to face the movable iron core 23. The return spring 26 biases the movable iron core 23 in the separation direction.

In the electromagnetic relay 1, when the coil 21 is energized, the magnetic force generated by the magnetic field generated by the coil 21 attracts the movable iron core 23 to the fixed iron core 24. Thereby, the movable iron core 23 and the drive shaft 15 move in the contact direction against the biasing force of the return spring 26. Thereby, the movable contact piece 8 moves to the closed position shown in FIG. 2. After the movable contacts 12 and 13 contact the fixed contacts 10 and 11, the drive shaft 15 further moves in the contact direction and thereby the contact spring 16 is compressed.

When the coil 21 is de-energized, the movable iron core 23 and the drive shaft 15 are moved in the separation direction by the biasing force of the return spring 26. As a result, the movable contact piece 8 moves to the open position shown in FIG. 1 and thereby the movable contacts 12 and 13 separate from the fixed contacts 10 and 11.

Figure 3:
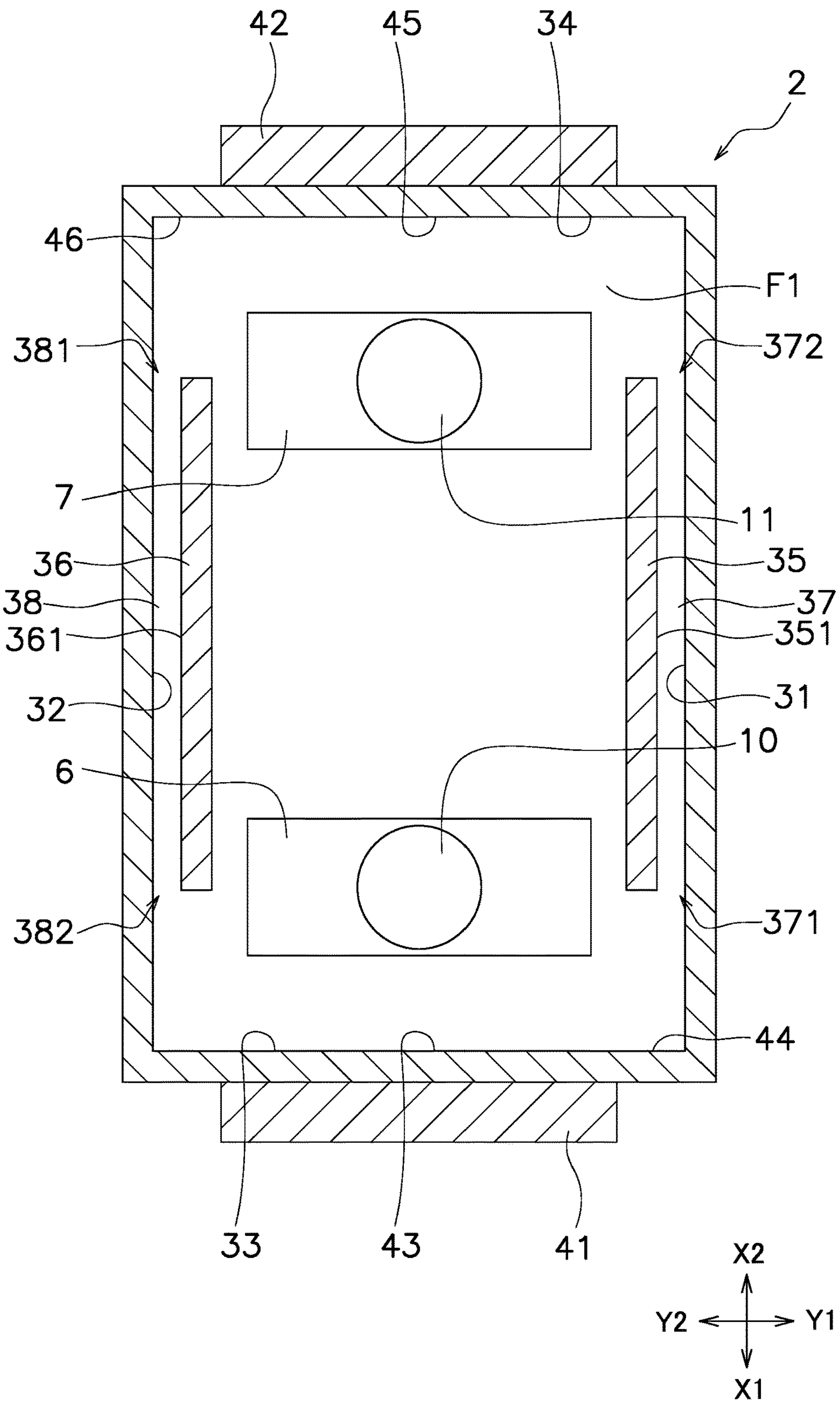
FIG. 3 is a section view taken along line III-III in FIG. 1.

FIG. 3 is a cross-sectional view taken along line III-III in FIG. 1. Hereinafter, a direction perpendicular to the longitudinal direction (X1, X2) and the vertical direction (Z1, Z2) is defined as a lateral direction (Y1, Y2). One direction of the lateral direction (Y1, Y2) is defined as a first lateral direction (Y1), and the opposite direction to the first lateral direction (Y1) is defined as a second lateral direction (Y2).

As shown in FIG. 3, the case 2 includes a first longitudinal inner side surface 31, a second longitudinal inner side surface 32, a first lateral inner side surface 33, and a second lateral inner side surface 34. The first longitudinal inner side surface 31 and the second longitudinal inner side surface 32 each extend in the longitudinal direction (X1, X2). The first longitudinal inner side surface 31 and the second longitudinal inner side surface 32 face each other in the lateral direction (Y1, Y2). The first fixed terminal 6 and the second fixed terminal 7 are disposed between the first longitudinal inner side surface 31 and the second longitudinal inner side surface 32 in the lateral direction (Y1, Y2).

The first longitudinal inner side surface 31 is disposed apart from the first fixed terminal 6 and the second fixed terminal 7 in the first lateral direction (Y1). The second longitudinal inner side surface 32 is disposed on the opposite side of the first longitudinal inner side surface 31 in the lateral direction (Y1, Y2). The second longitudinal inner side surface 32 is disposed apart from the first fixed terminal 6 and the second fixed terminal 7 in the second lateral direction (Y2). A length of the first longitudinal inner side surface 31 in the longitudinal direction (X1, X2) is greater than a length of the first lateral inner side surface 33 in the lateral direction (Y1, Y2). A length of the second longitudinal inner side surface 32 in the longitudinal direction (X1, X2) is greater than a length of the second lateral inner side surface 34 in the lateral direction (Y1, Y2).

The first lateral inner side surface 33 and the second lateral inner side surface 34 extend in the lateral direction (Y1, Y2). The first lateral inner side surface 33 and the second lateral inner side surface 34 face each other in the longitudinal direction (X1, X2). The first lateral inner side surface 33 is connected to the first longitudinal inner side surface 31 and the second longitudinal inner side surface 32. The second lateral inner side surface 34 is connected to the first longitudinal inner side surface 31 and the second longitudinal inner side surface 32.

The first fixed contact 10 and the second fixed contact 11 are disposed between the first lateral inner side surface 33 and the second lateral inner side surface 34 in the longitudinal direction (X1, X2). The first lateral inner side surface 33 is disposed apart from the first fixed terminal 6 in the first longitudinal direction (X1). The second lateral inner side surface 34 is disposed on the opposite side of the first lateral inner side surface 33 in the longitudinal direction (X1, X2). The second lateral inner side surface 34 is disposed apart from the second fixed terminal 7 in the second longitudinal direction (X2).

The electromagnetic relay 1 includes a first inner wall 35, a second inner wall 36, a first gas passage 37, and a second gas passage 38. The first inner wall 35 and the second inner wall 36 extend in the longitudinal direction (X1, X2). The first inner wall 35 extends from a position facing the first fixed terminal 6 to a position facing the second fixed terminal 7. The second inner wall 36 extends from a position facing the second fixed terminal 7 to a position facing the first fixed terminal 6. The first inner wall 35 is disposed between the first fixed terminal 6 and the first longitudinal inner side surface 31 in the lateral direction (Y1, Y2). The second inner wall 36 is disposed between the second fixed terminal 7 and the second longitudinal inner side surface 32 in the lateral direction (Y1, Y2). The first fixed terminal 6 and the second fixed terminal 7 are disposed between the first inner wall 35 and the second inner wall 36 in the lateral direction (Y1, Y2).

The first gas passage 37 is disposed between the first inner wall 35 and the first longitudinal inner side surface 31. The first inner wall 35 includes a first wall surface 351 facing the first gas passage 37. The first gas passage 37 is formed by the first longitudinal inner side surface 31 and the first wall surface 351. The first gas passage 37 extends in the longitudinal direction (X1, X2). The first gas passage 37 extends from a position facing the first fixed terminal 6 to a position facing the second fixed terminal 7. The first gas passage 37 includes a first inlet 371 and a first outlet 372. The first inlet 371 faces the first longitudinal direction (X1). The first outlet 372 faces the second longitudinal direction (X2).

The second gas passage 38 is disposed between the second inner wall 36 and the second longitudinal inner side surface 32. The second inner wall 36 includes a second wall surface 361 facing the second gas passage 38. The second gas passage 38 is formed by the second longitudinal inner side surface 32 and the second wall surface 361. The second gas passage 38 extends in the longitudinal direction (X1, X2). The second gas passage 38 extends from a position facing the second fixed terminal 7 to a position facing the first fixed terminal 6. The second gas passage 38 includes a second inlet 381 and a second outlet 382. The second inlet 381 faces the second longitudinal direction (X2). The second outlet 382 faces the first longitudinal direction (X1).

The electromagnetic relay 1 includes a first magnet 41 and a second magnet 42. The first magnet 41 and the second magnet 42 are permanent magnets. The first magnet 41 and the second magnet 42 are disposed around the case 2. The first magnet 41 is disposed in the first longitudinal direction (X1) with respect to the first fixed terminal 6. The first lateral inner side surface 33 is disposed between the first magnet 41 and the first fixed terminal 6 in the longitudinal direction (X1, X2). The second magnet 42 is disposed in the second longitudinal direction (X2) with respect to the second fixed terminal 7. The second lateral inner side surface 34 is disposed between the second magnet 42 and the second fixed terminal 7 in the longitudinal direction (X1, X2).

Figure 4:
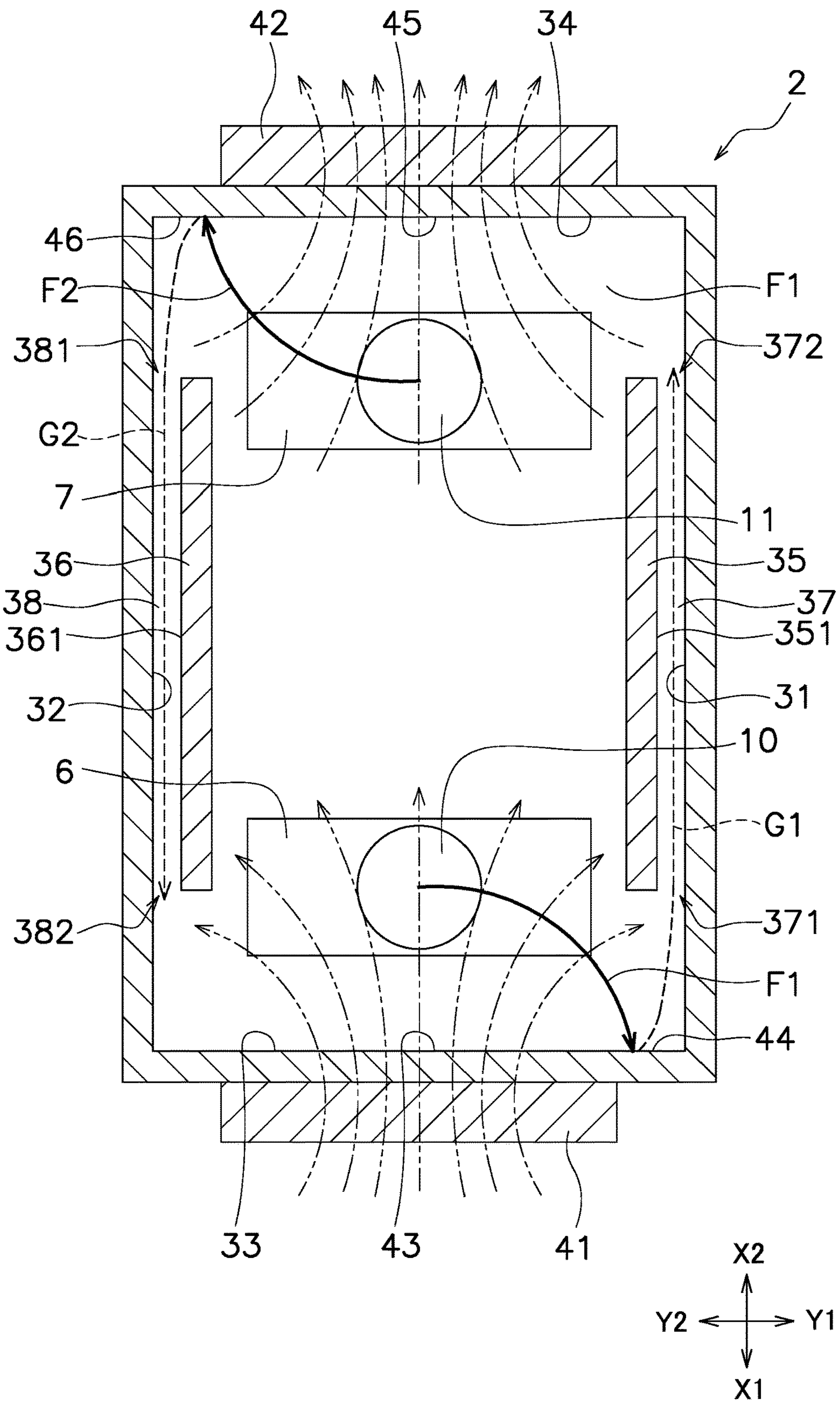
FIG. 4 is a schematic diagram showing a magnetic field and a direction of a Lorentz force.

As shown in FIG. 4, the first magnet 41 and the second magnet 42 generate magnetic fields inside the case 2. Arrows indicated by two-dot chain lines in FIG. 4 indicate the magnetic fields generated by the first magnet 41 and the second magnet 42. The first magnet 41 and the second magnet 42 are disposed with different poles facing each other. For example, the north pole of the first magnet 41 faces the south pole of the second magnet 42.

A first Lorentz force F1 acts on an arc generated between the first fixed contact 10 and the first movable contact 12 by the magnetic field from the first magnet 41. As a result, the starting point of the arc moves in the direction of the first Lorentz force F1. Also, the arc is elongated in the direction of the first Lorentz force F1. The first Lorentz force F1 acts in the first lateral direction (Y1) at the center of the first fixed contact 10. The first Lorentz force F1 turns in the first longitudinal direction (X1) as it moves away from the center of the first fixed contact 10 in the first lateral direction (Y1). Therefore, the arc is elongated toward the first lateral inner side surface 33 while moving from the center of the first fixed contact 10 in the first lateral direction (Y1).

A second Lorentz force F2 acts on an arc generated between the second fixed contact 11 and the second movable contact 13 by the magnetic field from the second magnet 42. As a result, the starting point of the arc moves in the direction of the second Lorentz force F2. Also, the arc is elongated in the direction of the second Lorentz force F2. The second Lorentz force F2 acts in the second lateral direction (Y2) at the center of the second fixed contact 11. The second Lorentz force F2 turns in the second longitudinal direction (X2) as it moves away from the center of the second fixed contact 11 in the second lateral direction (Y2). Therefore, the arc is elongated toward the second lateral inner side surface 34 while moving from the center of the second fixed contact 11 in the second lateral direction (Y2).

The first lateral inner side surface 33 includes a first central surface 43 and a first arc contact surface 44. The first central surface 43 and the first arc contact surface 44 are disposed flush with each other. The first central surface 43 faces the first fixed terminal 6 in the longitudinal direction (X1, X2). The first arc contact surface 44 is located between the first central surface 43 and the first longitudinal inner side surface 31 in the lateral direction (Y1, Y2). The first arc contact surface 44 is located between the first magnet 41 and the first longitudinal inner side surface 31 in the lateral direction (Y1, Y2). The first arc contact surface 44 is connected to the first longitudinal inner side surface 31. The first arc contact surface 44 is disposed at a position where it does not face the first magnet 41 in the longitudinal direction (X1, X2). The first inlet 371 faces the first arc contact surface 44 in the longitudinal direction (X1, X2).

The first magnet 41 is disposed in the longitudinal direction (X1, X2) with respect to the first central surface 43. The first magnet 41 elongates the arc generated between the first fixed contact 10 and the first movable contact toward the first arc contact surface 44. That is, the first magnet 41 is disposed so that the arc elongated by the first Lorentz force F1 contacts the first arc contact surface 44.

The second lateral inner side surface 34 includes a second central surface 45 and a second arc contact surface 46. The second central surface 45 and the second arc contact surface 46 are disposed flush with each other. The second central surface 45 faces the second fixed terminal 7 in the longitudinal direction (X1, X2). The second arc contact surface 46 is located between the second central surface 45 and the second longitudinal inner side surface 32 in the lateral direction (Y1, Y2). The second arc contact surface 46 is located between the second magnet 42 and the second longitudinal inner side surface 32 in the lateral direction (Y1, Y2). The second arc contact surface 46 is connected to the second longitudinal inner side surface 32. The second arc contact surface 46 is disposed at a position where it does not face the second magnet 42 in the longitudinal direction (X1, X2). The second inlet 381 faces the second arc contact surface 46 in the longitudinal direction (X1, X2).

The second magnet 42 is disposed in the longitudinal direction (X1, X2) with respect to the second central surface 45. The second magnet 42 elongates the arc generated between the second fixed contact 11 and the second movable contact 13 toward the second arc contact surface 46. That is, the second magnet 42 is disposed so that the arc elongated by the second Lorentz force F2 contacts the second arc contact surface 46.

Figure 5:
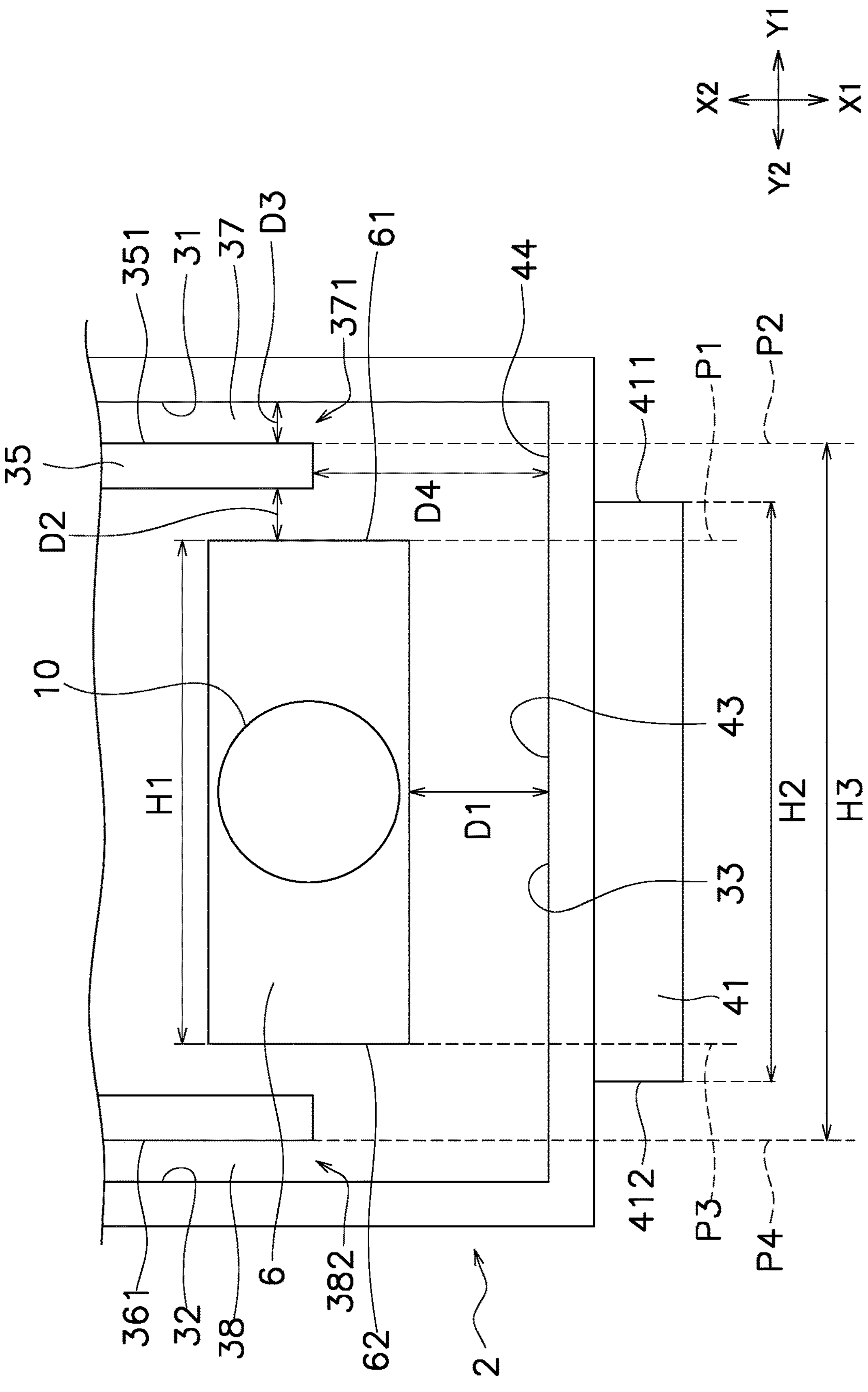
FIG. 5 is an enlarged view of a first fixed terminal, a case, and a first magnet viewed from below.

FIG. 5 is an enlarged view of the first fixed terminal 6, the case 2, and the first magnet 41 viewed from below (Z2). As shown in FIG. 5, the first magnet 41 is shorter than the first lateral inner side surface 33 in the lateral direction (Y1, Y2). A length H2 of the first magnet 41 in the lateral direction (Y1, Y2) is greater than a length H1 of the first fixed terminal 6 in the lateral direction (Y1, Y2). The length H2 of the first magnet 41 in the lateral direction (Y1, Y2) is smaller than a length H3 between the first wall surface 351 and the second wall surface 361 in the lateral direction (Y1, Y2).

The first magnet 41 extends to a range between a first terminal position P1 and a first wall position P2 in the first lateral direction (Y1). The first fixed terminal 6 includes a first terminal end 61 in the first lateral direction (Y1) and a second terminal end 62 in the second lateral direction (Y2). The first terminal position P1 is a position aligned with the first terminal end 61 of the first fixed terminal 6. The first wall position P2 is a position aligned with the first wall surface 351. The first magnet 41 extends to a range between a second terminal position P3 and a second wall position P4 in the second lateral direction (Y2). The second terminal position P3 is a position aligned with the second terminal end 62 of the first fixed terminal 6. The second wall position P4 is a position aligned with the second wall surface 361.

The first magnet 41 includes a first magnet end 411 in the first lateral direction (Y1) and a second magnet end 412 in the second lateral direction (Y2). The first magnet end 411 is positioned between the first terminal position P1 and the first wall position P2. The first magnet end 411 may be located at the first terminal position P1. The first magnet end 411 may be located at the first wall position P2. The second magnet end 412 is located between the second terminal position P3 and the second wall position P4. The second magnet end 412 may be located at the second terminal position P3. The second magnet end 412 may be located at the second wall position P4.

In the longitudinal direction (X1, X2), a distance D4 between the first inner wall 35 and the first lateral inner side surface 33 is greater than or equal to a distance D1 between the first fixed terminal 6 and the first lateral inner side surface 33. A distance D2 in the lateral direction (Y1, Y2) between the first fixed terminal 6 and the first inner wall 35 is less than or equal to a distance D1 in the longitudinal direction (X1, X2) between the first fixed terminal 6 and the first lateral inner side surface 33. A width D3 of the first gas passage 37 in the lateral direction (Y1, Y2) is less than or equal to the distance D2 in the lateral direction (Y1, Y2) between the first fixed terminal 6 and the first inner wall 35.

Figure 6:
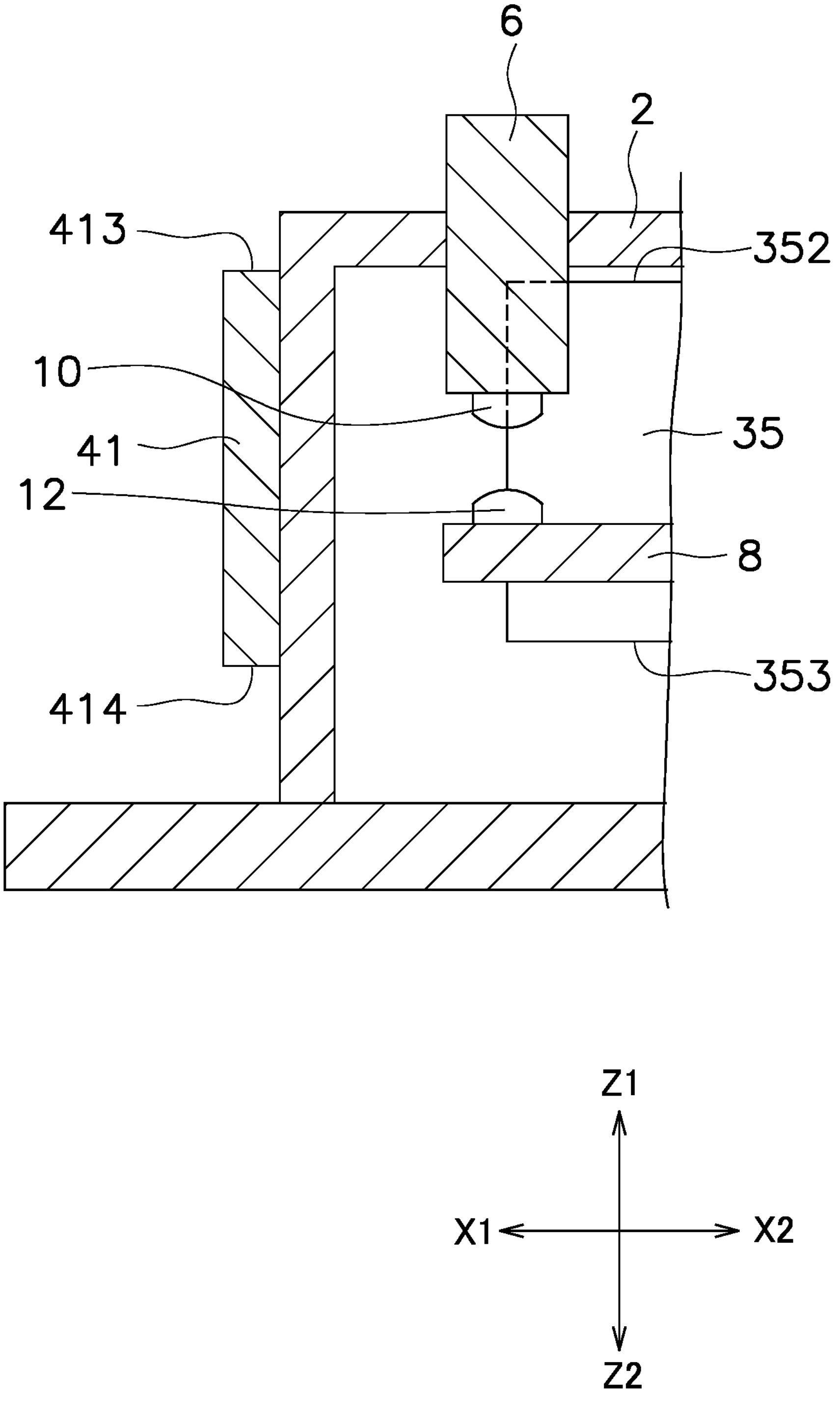
FIG. 6 is an enlarged view of the first fixed terminal, the case, and the first magnet viewed from a lateral side.

FIG. 6 is an enlarged view of the first fixed terminal 6, the case 2, and the first magnet 41 viewed from the lateral direction (Y1, Y2). As shown in FIG. 6, an upper end 413 of the first magnet 41 is positioned at the same height as or higher than an upper end 352 of the first inner wall 35. The upper end 352 of the first inner wall 35 is disposed above (Z1) the first fixed contact 10 and the first movable contact 12. A lower end 414 of the first magnet 41 is disposed at the same height as or lower than a lower end 353 of the first inner wall 35. The lower end 353 of the first inner wall 35 is disposed below (Z2) the first fixed contact 10 and the first movable contact 12.

The second fixed terminal 7, the second lateral inner side surface 34, and the second magnet 42 are disposed symmetrically with respect to the first fixed terminal 6, the first lateral inner side surface 33, and the first magnet 41. Therefore, the arrangement of the second fixed terminal 7, the second lateral inner side surface 34, the second magnet 42, the second inner wall 36, and the second gas passage 38 is the same as that of the first fixed terminal 6, the first lateral inner side surface 33, the magnet 41, the first inner wall 35, and the first gas passage 37 described above.

In the electromagnetic relay 1 according to the present embodiment described above, as shown in FIG. 4, an arc generated between the first fixed contact 10 and the first movable contact 12 is elongated toward the first arc contact surface 44 and contacts the first arc contact surface 44. As indicated by the dashed arrow G1, the high temperature gas generated at the first fixed contact 10 and the first movable contact 12 flows toward the first arc contact surface 44 together with the arc. The high temperature gas flows from the first arc contact surface 44 toward the first inlet 371 and flows into the first gas passage 37 from the first inlet 371. The first gas passage 37 extends in the longitudinal direction (X1, X2). Therefore, the high temperature gas is prevented from returning to the vicinity of the first fixed contact 10 and the first movable contact 12. Re-arcing of an arc is thereby suppressed. Also, the high temperature gas flows to the first inlet 371 via the first arc contact surface 44. Therefore, as compared with the case where high temperature gas flows directly into the first inlet 371, consumption of the first inlet 371 is reduced.

The arc generated between the second fixed contact 11 and the second movable contact 13 is extended toward the second arc contact surface 46 and contacts the second arc contact surface 46. As indicated by the dashed arrow G2, the high temperature gas generated at the second fixed contact 11 and the second movable contact 13 flows toward the second arc contact surface 46 together with the arc. The high temperature gas flows from the second arc contact surface 46 toward the second inlet 381 and flows into the second gas passage 38 from the second inlet 381. The second gas passage 38 extends in the longitudinal direction (X1, X2). Therefore, the high temperature gas is prevented from returning to the vicinity of the second fixed contact 11 and the second movable contact 13. Re-arcing of an arc is thereby suppressed. Also, the high temperature gas flows to the second inlet 381 via the second arc contact surface 46. Therefore, as compared with the case where high temperature gas flows directly to the second inlet 381, consumption of the second inlet 381 is reduced.

Although one embodiment of the claimed invention has been described above, the claimed invention is not limited to the above-described embodiment, and various modifications are possible without departing from the scope of the invention.

The structure of the drive device 4 is not limited to that of the above embodiment and may be modified. For example, in the embodiment described above, the drive device 4 is disposed below the contact device 3. However, the drive device 4 may be disposed in the longitudinal direction (X1, X2) or the lateral direction (Y1, Y2) with respect to the contact device 3. The drive device 4 is not limited to the plunger type structure as in the above embodiment and may have a hinge type structure.

The structure of the contact device 3 is not limited to that of the above embodiment and may be modified. For example, the number of fixed contacts and movable contacts is not limited to two and may be more than two. The arrangement and dimensions of the first fixed terminal 6, the first lateral inner side surface 33, the first magnet 41, the first inner wall 35, and the first gas passage 37 are not limited to those in the above embodiment and may be changed. The arrangement and dimensions of the second fixed terminal 7, the second lateral inner side surface 34, the second magnet 42, the second inner wall 36, and the second gas passage 38 are not limited to those in the above embodiment and may be changed.

Figure 7:
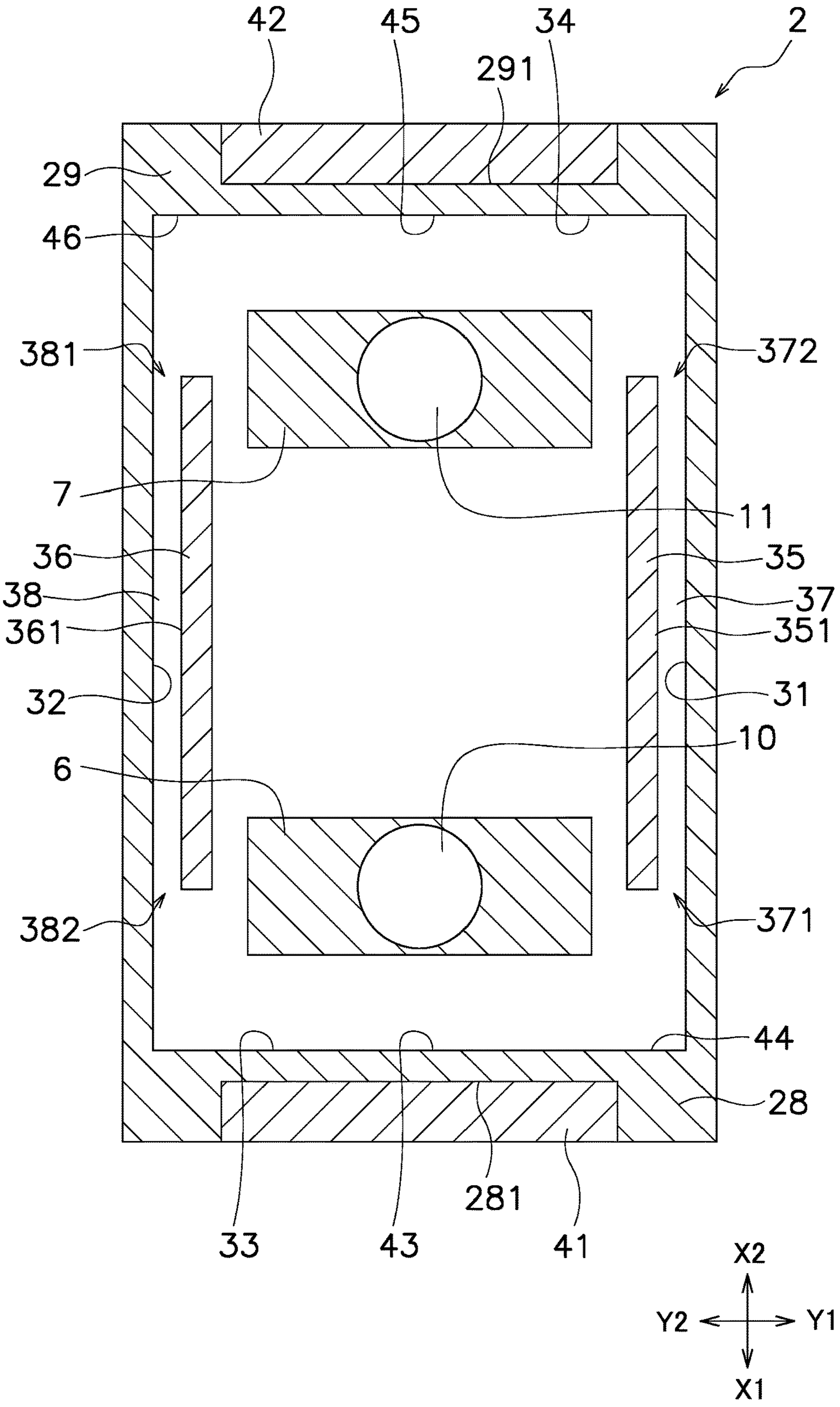
FIG. 7 is a diagram showing the electromagnetic relay according to a first modification.

FIG. 7 is a diagram showing the electromagnetic relay 1 according to a first modification. As shown in FIG. 7, the case 2 includes a first lateral sidewall 28 and a second lateral sidewall 29. The first lateral sidewall 28 includes the first lateral inner side surface 33. The second lateral sidewall 29 includes the second lateral inner side surface 34. The first magnet 41 may be embedded in the first lateral sidewall 28. The second magnet 42 may be embedded in the second lateral sidewall 29.

Specifically, the first lateral sidewall 28 may include a first recess 281 recessed from the outer surface. The first magnet 41 may be disposed within the first recess 281. The second lateral sidewall 29 may include a second recess 291 recessed from the outer surface. The second magnet 42 may be disposed within the second recess 291. In this case, the first magnet 41 is covered with the first lateral sidewall 28 in the lateral direction (Y1, Y2). As a result, the thickness of the first lateral sidewall 28 is increased outside the first arc contact surface 44. Also, the second magnet 42 is covered with the second lateral sidewall 29 in the lateral direction (Y1, Y2). As a result, the thickness of the second lateral sidewall 29 increases outside the second arc contact surface 46. As a result, the cooling effect of an arc and high temperature gas on the first arc contact surface 44 and the second arc contact surface 46 is improved.

Figure 8:
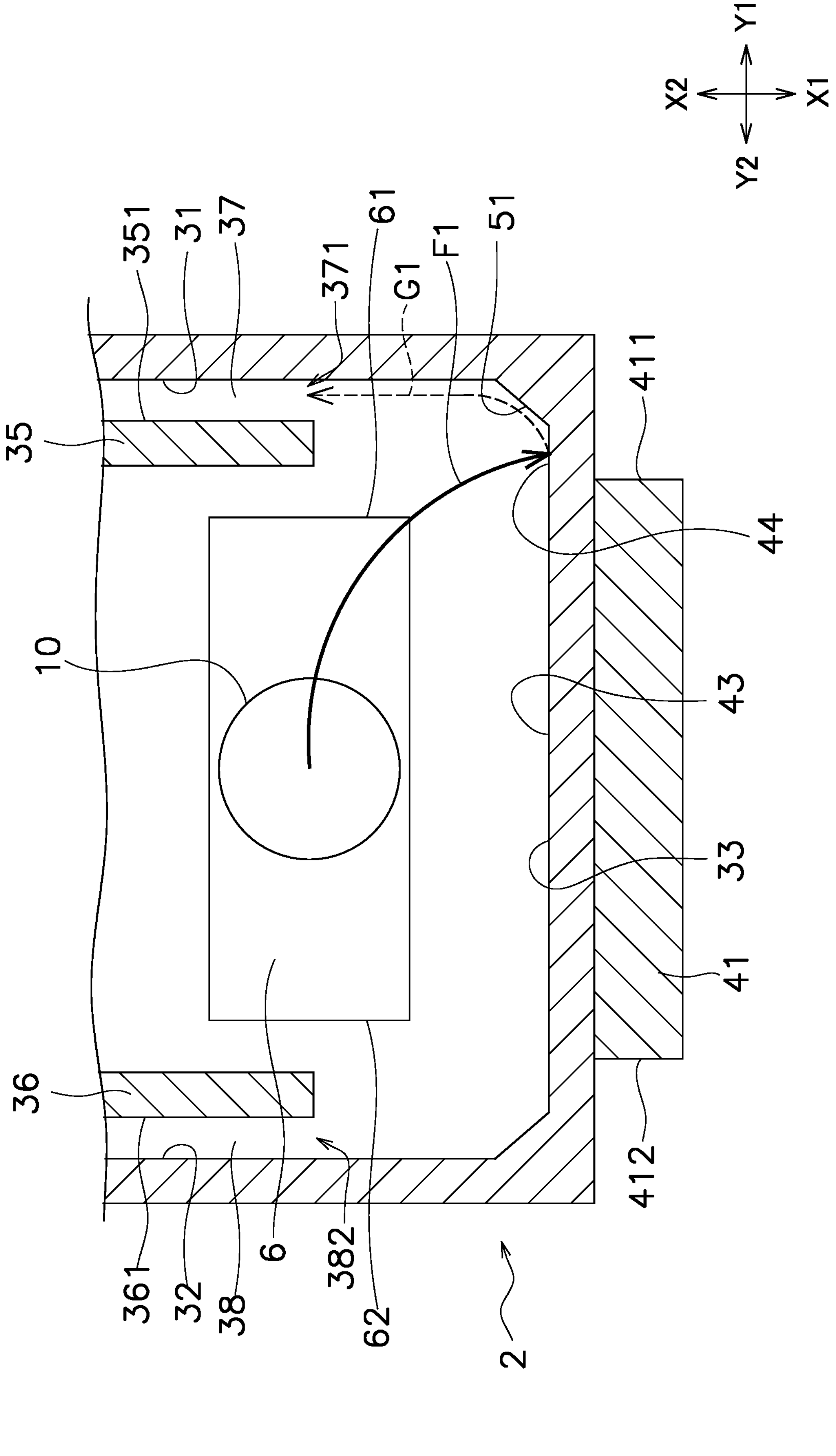
FIG. 8 is a diagram showing the electromagnetic relay according to a second modification.

FIG. 8 is a diagram showing the electromagnetic relay 1 according to a second modification. As shown in FIG. 8, the case 2 may include a first corner 51 between the first arc contact surface 44 and the first longitudinal inner side surface 31. The first corner 51 may be inclined with respect to the first arc contact surface 44 and the first longitudinal inner side surface 31. In this case, the high temperature gas can be guided efficiently from the first arc contact surface 44 to the first inlet 371 by the first corner 51. Although not shown, the case 2 may include a second corner between the second arc contact surface 46 and the second longitudinal inner side surface 32. The second corner may be slanted with respect to the second arc contact surface 46 and the second longitudinal inner side surface 32.

Figure 9:
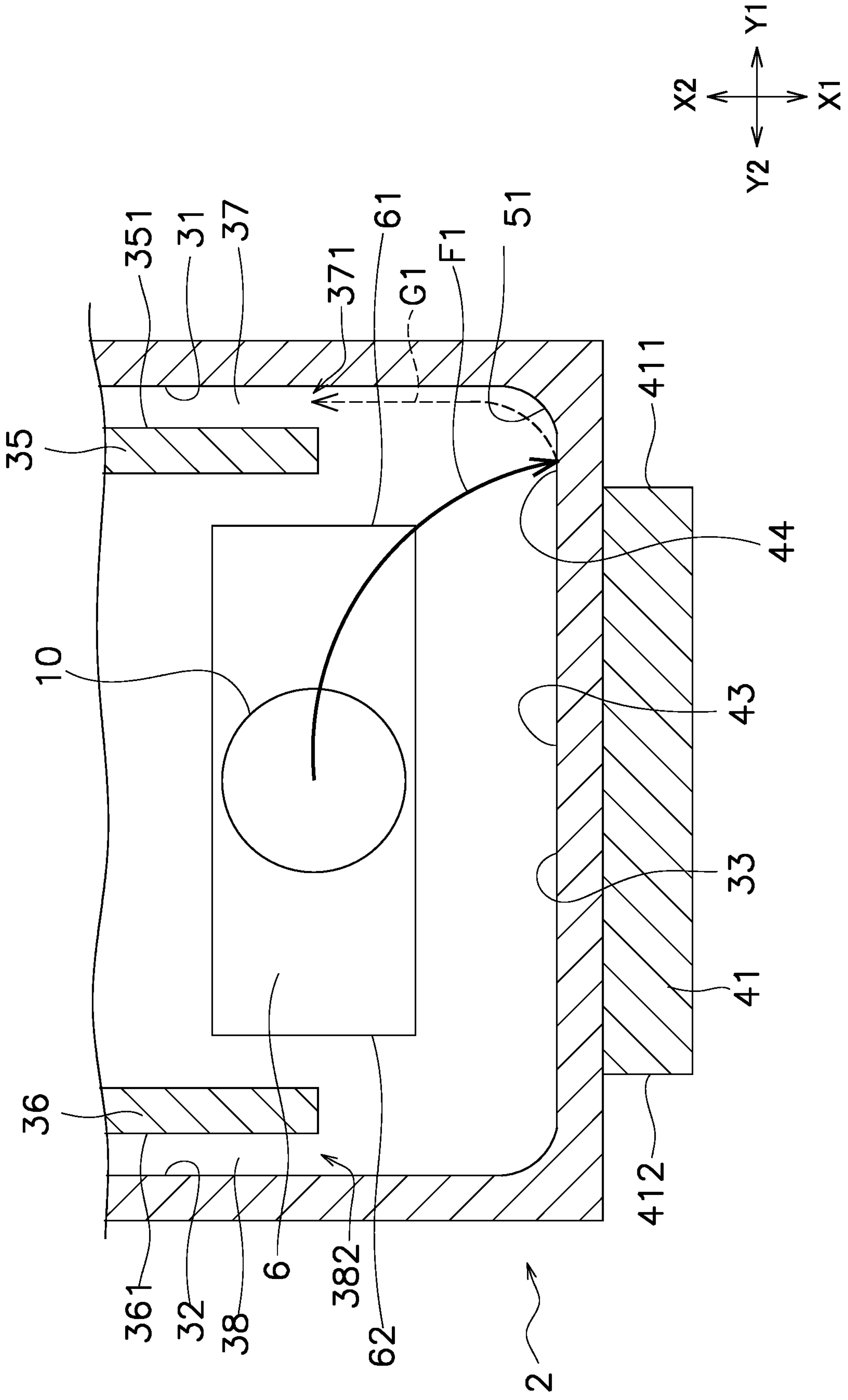
FIG. 9 is a diagram showing the electromagnetic relay according to a third modification.

FIG. 9 is a diagram showing the electromagnetic relay 1 according to a third modification. As shown in FIG. 9, the first corner 51 may have a curved shape. In this case, the high temperature gas can be guided efficiently from the first arc contact surface 44 to the first inlet 371 by the first corner 51. Although not shown, the second corner between the second arc contact surface 46 and the second longitudinal inner side surface 32 may have a curved shape.

Figure 10:
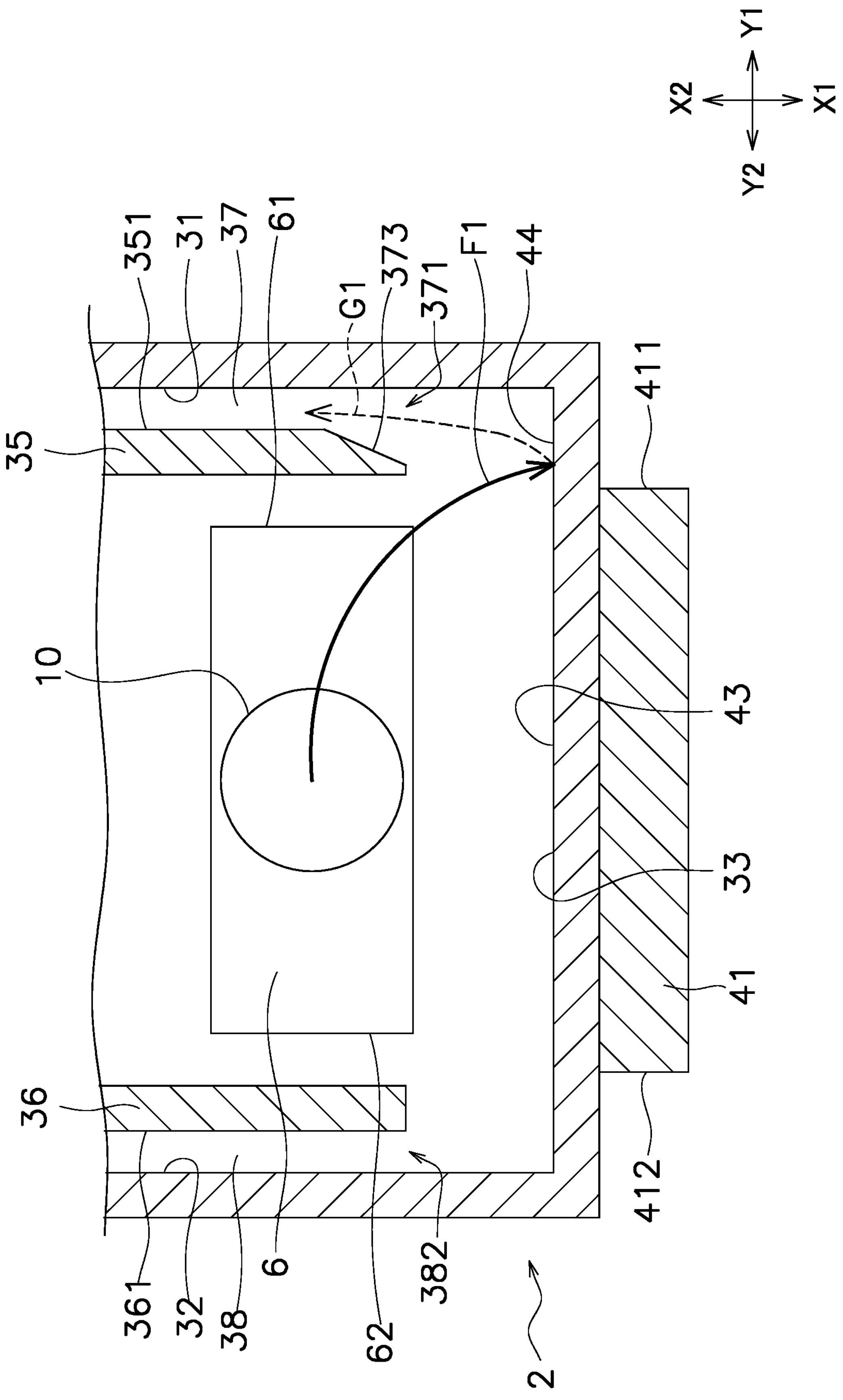
FIG. 10 is a diagram showing the electromagnetic relay according to a fourth modification.

FIG. 10 is a diagram showing the electromagnetic relay 1 according to a fourth modification. As shown in FIG. 10, the first inlet 371 may have a first tapered shape 373 that widens toward the first arc contact surface 44. In this case, the first tapered shape 373 can efficiently guide the high temperature gas from the first inlet 371 into the first gas passage 37. Although not shown, the second inlet 381 may have a second tapered shape that widens toward the second arc contact surface 46.

Figure 11:
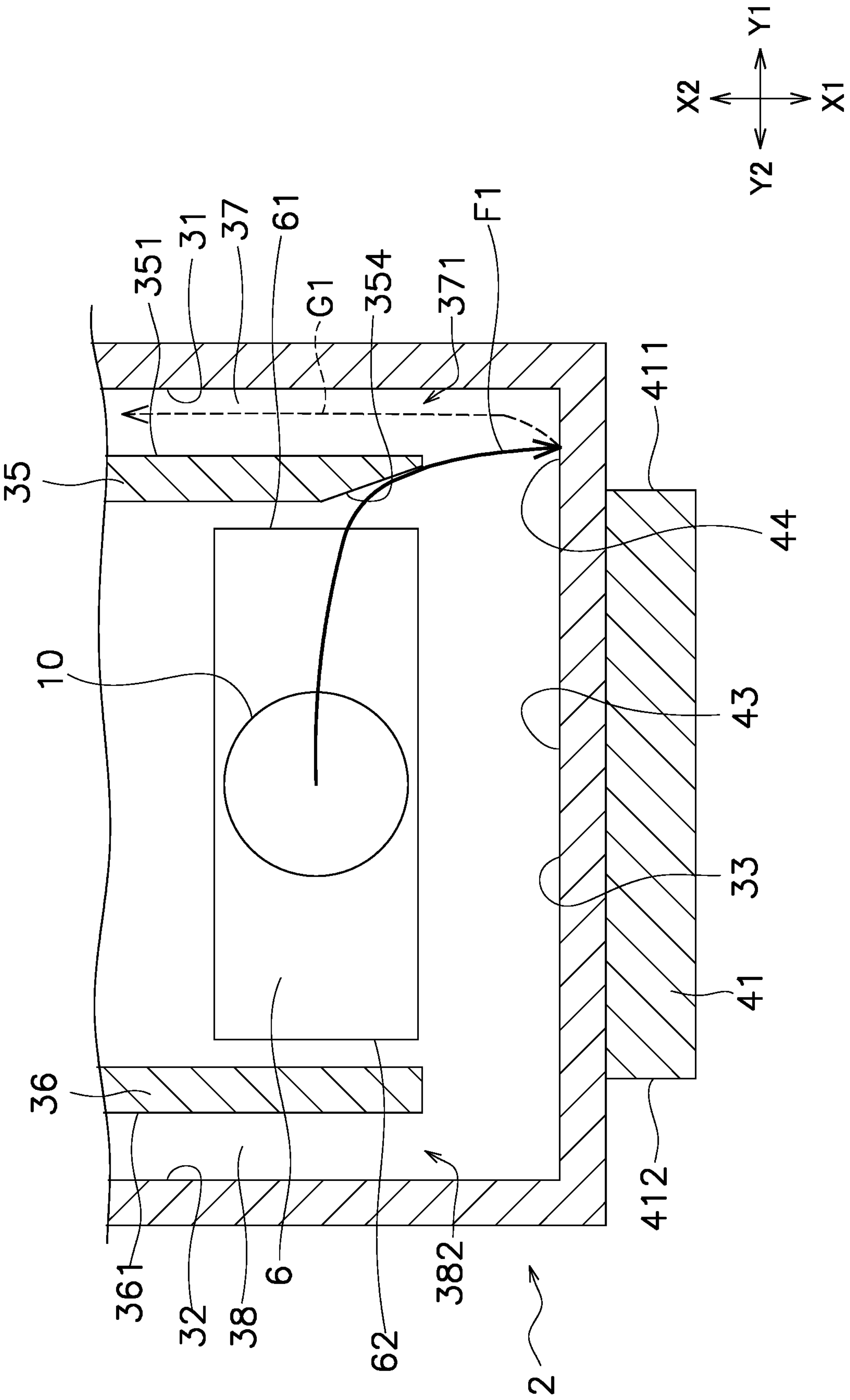
FIG. 11 is a diagram showing the electromagnetic relay according to a fifth modification.

FIG. 11 is a diagram showing the electromagnetic relay 1 according to a fifth modification. As shown in FIG. 11, the first inner wall 35 may include a first tapered surface 354 extending toward the first arc contact surface 44. In this case, the first tapered surface 354 can efficiently guide the high temperature gas to the first arc contact surface 44. Although not shown, the second inner wall 36 may include a second tapered surface extending toward the second arc contact surface 46.

Figure 12:
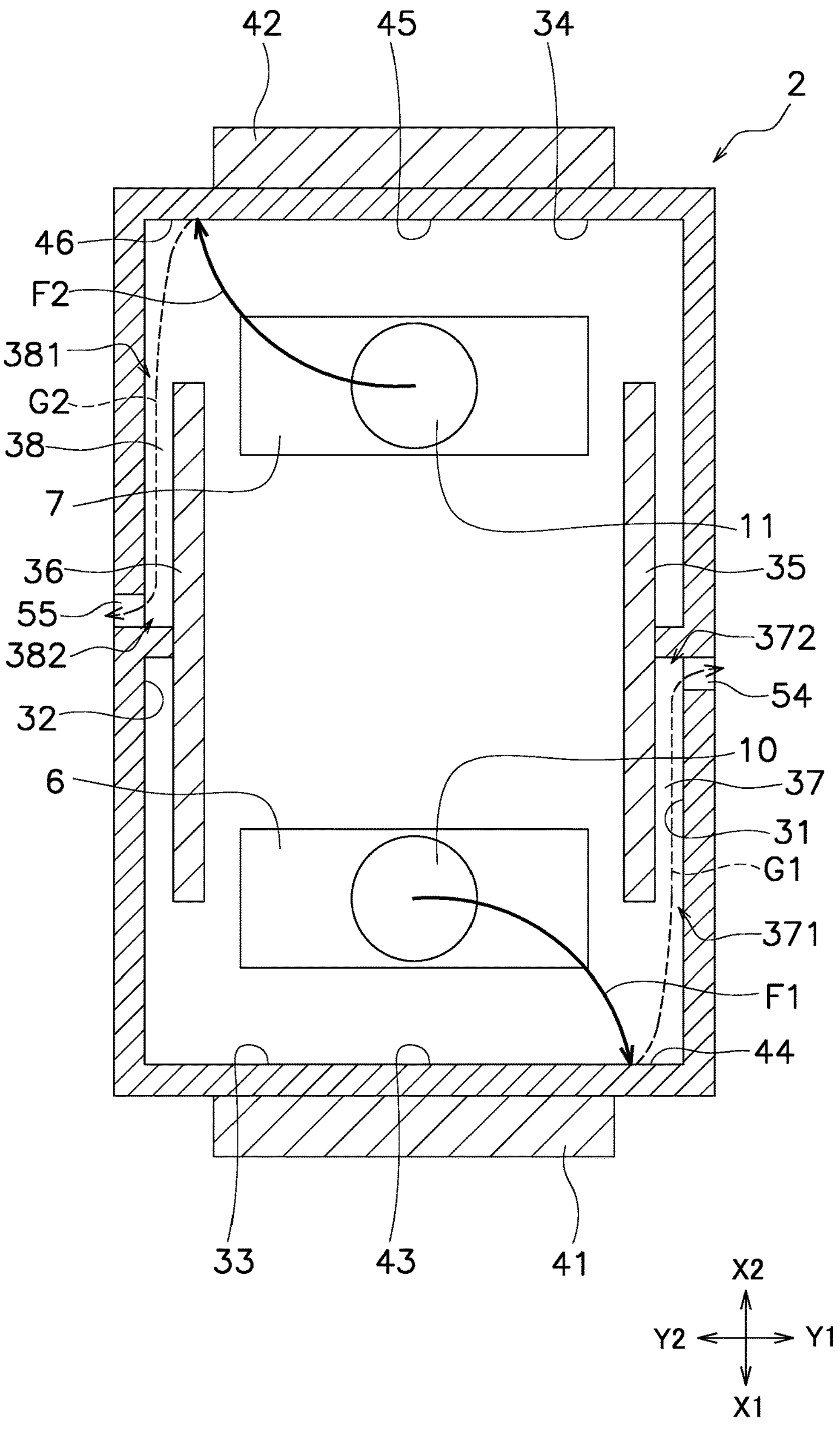
FIG. 12 is a diagram showing the electromagnetic relay according to a sixth modification.

FIG. 12 is a diagram showing the electromagnetic relay 1 according to a sixth modification. As shown in FIG. 12, the case 2 may include a first hole 54 communicating with the first gas passage 37. In this case, the high temperature gas can escape from the first gas passage 37 to the outside of the case 2 through the first hole 54. The case 2 may include a second hole 55 communicating with the second gas passage 38. In this case, the high temperature gas can escape from the second gas passage 38 to the outside of the case 2 through the second hole 55.

Figure 13:
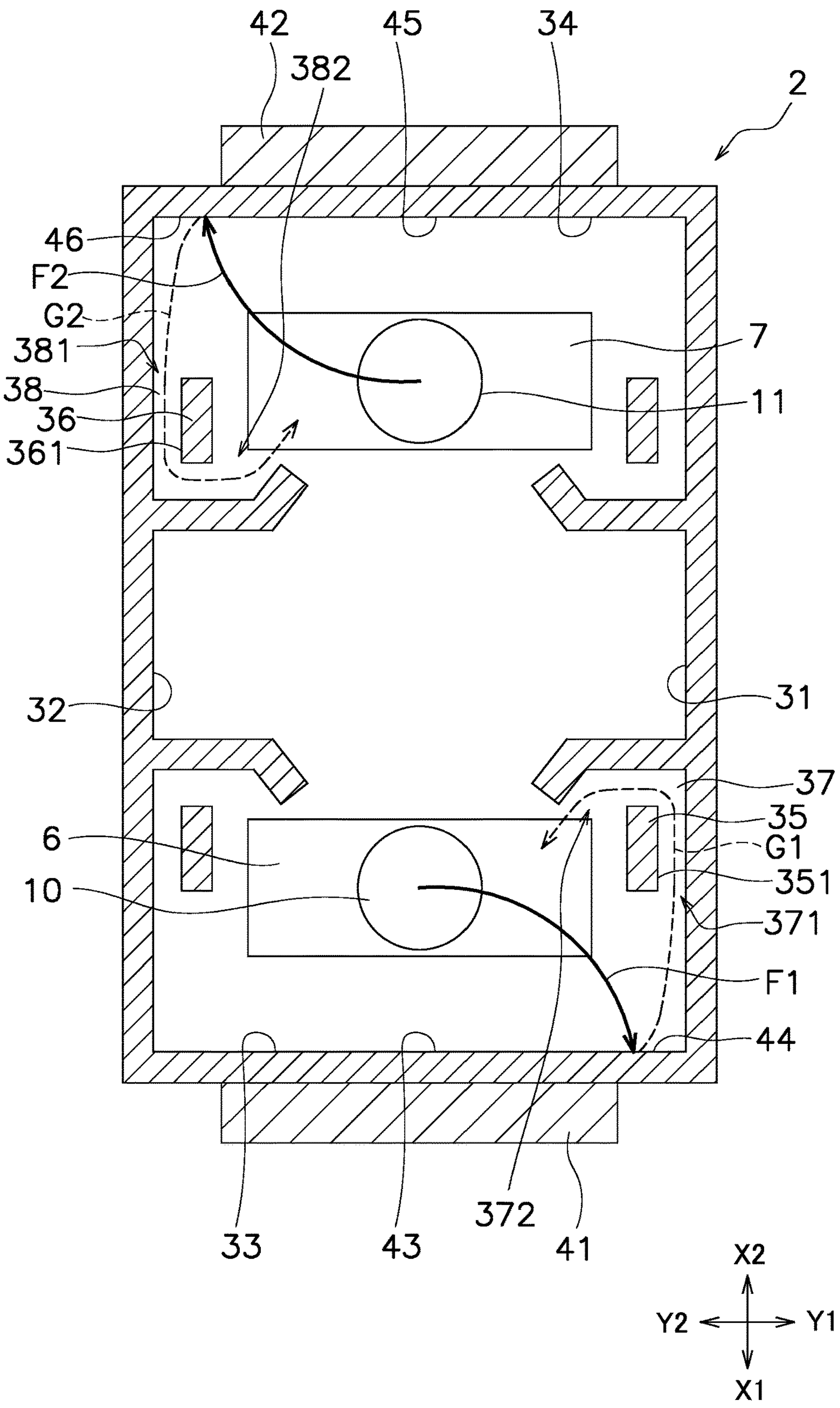
FIG. 13 is a diagram showing the electromagnetic relay according to a seventh modification.

FIG. 13 is a diagram showing the electromagnetic relay 1 according to a seventh modification. As shown in FIG. 13, the first gas passage 37 may have a shape bent toward the first fixed terminal 6. The first outlet 372 of the first gas passage 37 may be disposed toward the first fixed terminal 6. In this case, the high temperature gas is cooled while passing through the first gas passage 37 and then blown out from the first outlet 372 toward the first fixed contact 10. Thereby, the arc can be effectively cooled. As with the first gas passage 37, the second gas passage 38 may have a shape bent toward the second fixed terminal 7. The second outlet 382 of the second gas passage 38 may be disposed toward the second fixed terminal 7.

Figure 14:
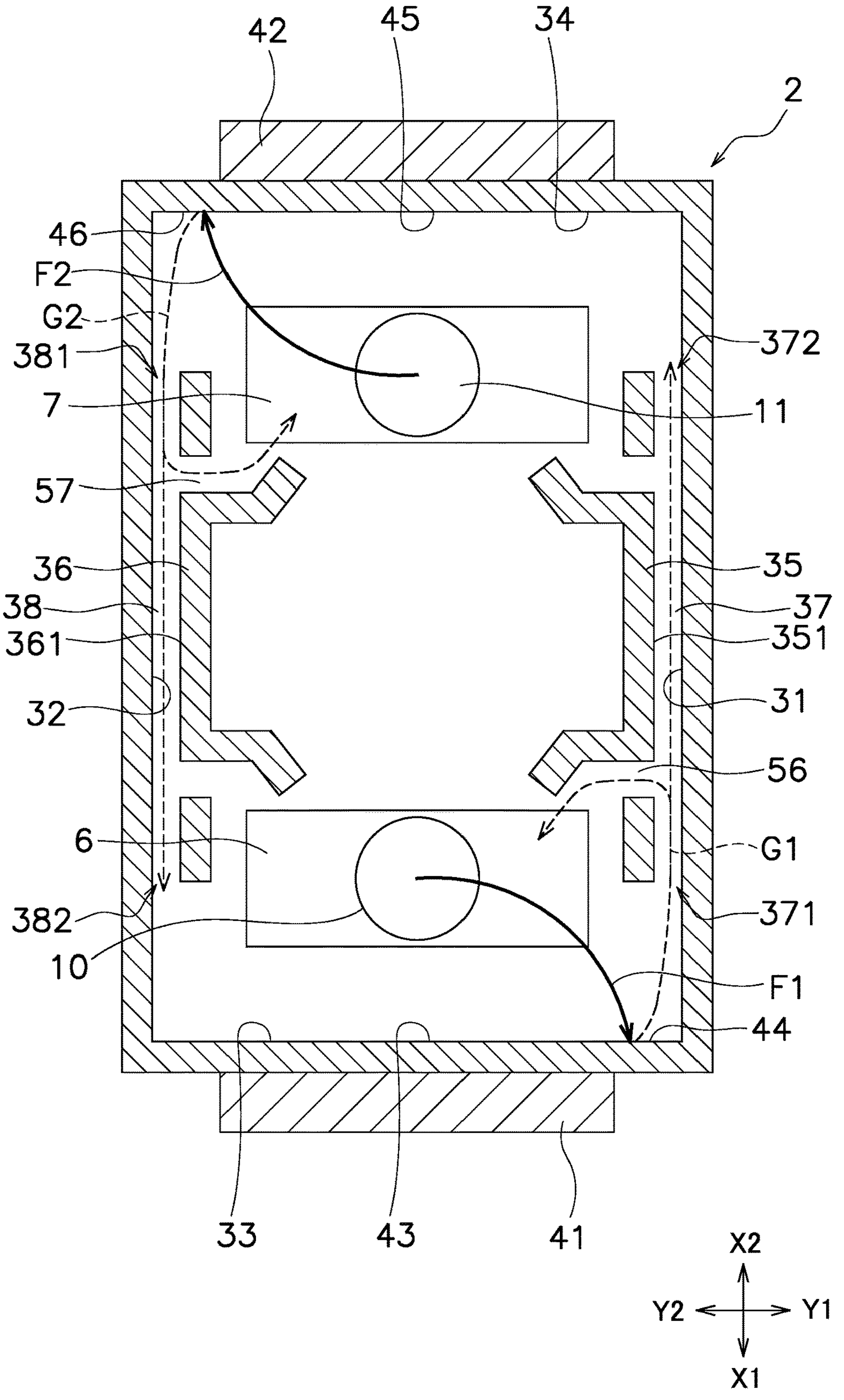
FIG. 14 is a diagram showing the electromagnetic relay according to an eighth modification.

FIG. 14 is a diagram showing the electromagnetic relay 1 according to an eighth modification. As shown in FIG. 14, the electromagnetic relay 1 may have a first branch passage 56. The first branch passage 56 may branch from the first gas passage 37 toward the first fixed terminal 6 from the first gas passage 37. In this case, part of the high temperature gas is cooled while passing through the first branch passage 56 and then blown out from the first branch passage 56 toward the first fixed contact 10. Thereby, the arc can be effectively cooled. Also, the electromagnetic relay 1 may include a second branch passage 57. The second branch passage 57 may branch from the second gas passage 38 toward the second fixed terminal 7 from the second gas passage 38.

REFERENCE SIGNS LIST

2: Case, 6: First fixed terminal, 7: Second fixed terminal, 11: Second fixed contact, 10: First fixed contact, 12: First movable contact, 13: Second movable contact, 28: First lateral sidewall, 31: First longitudinal inner side surface, 32: Second longitudinal inner side surface, 33: First lateral inner side surface, 34: Second lateral inner side surface, 35: First inner wall, 36: Second inner wall, 37: First gas passage, 38: Second gas passage, 41: First magnet, 42: Second magnet, 43: First central surface, 44: First arc contact surface, 45: Second central surface, 46: Second arc contact surface, 51: First corner, 54: First hole, 351: First wall surface, 354: First tapered surface, 371: First inlet, 373: First tapered shape, 381: Second inlet, X1, X2: Longitudinal direction, Y1, Y2: Lateral direction

The invention claimed is:

1. An electromagnetic relay, comprising:

a first fixed terminal;

a first fixed contact connected to the first fixed terminal;

a first movable contact configured to contact and separate from the first fixed contact;

a second fixed terminal disposed apart from the first fixed terminal in a longitudinal direction;

a second fixed contact connected to the second fixed terminal;

a second movable contact configured to contact and separate from the second fixed contact;

a case housing the first fixed terminal, the first fixed contact, the first movable contact, the second fixed terminal, the second fixed contact, and the second movable contact, the case including a first longitudinal inner side surface extending in the longitudinal direction and disposed apart from the first fixed terminal in a lateral direction perpendicular to the longitudinal direction, and a first lateral inner side surface extending in the lateral direction and including a first central surface facing the first fixed terminal in the longitudinal direction and a first arc contact surface located between the first central surface and the first longitudinal inner side surface in the lateral direction;

a first inner wall disposed between the first fixed terminal and the first longitudinal inner side surface in the lateral direction and extending in the longitudinal direction;

a first gas passage including a first inlet facing the first arc contact surface in the longitudinal direction, the first gas passage extending in the longitudinal direction, the first gas passage being disposed between the first inner wall and the first longitudinal inner side surface; and a first magnet disposed in the longitudinal direction with respect to the first central surface, the first magnet being configured to elongate an arc generated between the first fixed contact and the first movable contact toward the first are contact surface.

2. The electromagnetic relay according to claim 1, wherein the first arc contact surface is located between the first magnet and the first longitudinal inner side surface in the lateral direction.

3. The electromagnetic relay according to claim 1, wherein the first inner wall includes a wall surface facing the first gas passage, and the first magnet extends in the lateral direction to a range between a first terminal position aligned with an end of the first fixed terminal and a first wall position aligned with the wall surface.

4. The electromagnetic relay according to claim 1, wherein in the longitudinal direction, a distance between the first inner wall and the first lateral inner side surface is greater than or equal to a distance between the first fixed terminal and the first lateral inner side surface.

5. The electromagnetic relay according to claim 1, wherein a distance between the first fixed terminal and the first inner wall in the lateral direction is less than or equal to a distance between the first fixed terminal and the first lateral inner side surface in the longitudinal direction.

6. The electromagnetic relay according to claim 1, wherein a width of the first gas passage in the lateral direction is less than or equal to a distance between the first fixed terminal and the first inner wall in the lateral direction.

7. The electromagnetic relay according to claim 1, wherein the case includes a first lateral sidewall including the first lateral inner side surface and the first magnet is embedded in the first lateral sidewall.

8. An electromagnetic relay, comprising:

a first fixed terminal;

a first fixed contact connected to the first fixed terminal;

a first movable contact configured to contact and separate from the first fixed contact:

a second fixed terminal disposed apart from the first fixed terminal in a longitudinal direction;

a second fixed contact connected to the second fixed terminal;

a second movable contact configured to contact and separate from the second fixed contact;

a case housing the first fixed terminal, the first fixed contact, the first movable contact, the second fixed terminal, the second fixed contact, and the second movable contact, the case including a first longitudinal inner side surface extending in the longitudinal direction and disposed apart from the first fixed terminal in a lateral direction perpendicular to the longitudinal direction, a first lateral inner side surface extending in the lateral direction and including a first central surface facing the first fixed terminal in the longitudinal direction and a first arc contact surface located between the first central surface and the first longitudinal inner side surface in the lateral direction, and a corner between the first arc contact surface and the first longitudinal inner side surface, the corner being inclined with respect to the first arc contact surface and the first longitudinal inner side surface;

a first inner wall disposed between the first fixed terminal and the first longitudinal inner side surface in the lateral direction and extending in the longitudinal direction;

a first gas passage including a first inlet facing the first arc contact surface in the longitudinal direction, the first gas passage extending in the longitudinal direction, the first gas passage being disposed between the first inner wall and the first longitudinal inner side surface; and a first magnet disposed in the longitudinal direction with respect to the first central surface, the first magnet being configured to elongate an arc generated between the first fixed contact and the first movable contact toward the first are contact surface.

9. An electromagnetic relay, comprising:

a first fixed terminal;

a first fixed contact connected to the first fixed terminal;

a first movable contact configured to contact and separate from the first fixed contact:

a second fixed terminal disposed apart from the first fixed terminal in a longitudinal direction;

a second fixed contact connected to the second fixed terminal;

a second movable contact configured to contact and separate from the second fixed contact;

a case housing the first fixed terminal, the first fixed contact, the first movable contact, the second fixed terminal, the second fixed contact, and the second movable contact, the case including a first longitudinal inner side surface extending in the longitudinal direction and disposed apart from the first fixed terminal in a lateral direction perpendicular to the longitudinal direction, a first lateral inner side surface extending in the lateral direction and including a first central surface facing the first fixed terminal in the longitudinal direction and a first arc contact surface located between the first central surface and the first longitudinal inner side surface in the lateral direction, and a corner between the first arc contact surface and the first longitudinal inner side surface and the corner has a curved shape;

a first inner wall disposed between the first fixed terminal and the first longitudinal inner side surface in the lateral direction and extending in the longitudinal direction;

a first gas passage including a first inlet facing the first arc contact surface in the longitudinal direction, the first gas passage extending in the longitudinal direction, the first gas passage being disposed between the first inner wall and the first longitudinal inner side surface: and a first magnet disposed in the longitudinal direction with respect to the first central surface, the first magnet being configured to elongate an arc generated between the first fixed contact and the first movable contact toward the first arc contact surface.

10. The electromagnetic relay according to claim 1, wherein the first inlet has a tapered shape that widens toward the first are contact surface.

11. The electromagnetic relay according to claim 1, wherein the first inner wall includes a tapered surface extending toward the first arc contact surface.

12. The electromagnetic relay according to claim 1, wherein the case includes a hole communicating with the first gas passage.

13. The electromagnetic relay according to claim 1, wherein the first gas passage extends from a position facing the first fixed terminal to a position facing the second fixed terminal.

14. The electromagnetic relay according to claim 1, further comprising:

a second inner wall;

a second gas passage; and a second magnet, wherein the case includes a second longitudinal inner side surface disposed in the lateral direction opposite to the first longitudinal inner side surface and disposed apart from the first fixed terminal and the second fixed terminal in the lateral direction, and a second lateral inner side surface disposed in the longitudinal direction opposite to the first lateral inner side surface and disposed apart from the second fixed terminal in the longitudinal direction, the second lateral inner side surface includes a second central surface facing the second fixed terminal in the longitudinal direction, and a second arc contact surface located between the second central surface and the second longitudinal inner side surface in the lateral direction, the second inner wall is disposed between the second fixed terminal and the second longitudinal inner side surface in the lateral direction and extends in the longitudinal direction, the second gas passage includes a second inlet facing the second arc contact surface in the longitudinal direction, extends in the longitudinal direction, and is disposed between the second inner wall and the second longitudinal inner side surface, and the second magnet is disposed in the longitudinal direction with respect to the second central surface and is configured to elongate an arc generated between the second fixed contact and the second movable contact toward the second arc contact surface.

15. The electromagnetic relay according to claim 14, wherein the second inner wall and the second gas passage extend from a position facing the second fixed terminal to a position facing the first fixed terminal.

* * * * *